(12) United States Patent
Haynes et al.

(10) Patent No.: US 7,456,754 B1
(45) Date of Patent: Nov. 25, 2008

(54) ANTIFRATRICIDE BEACON

(76) Inventors: Derek Haynes, 25080 Goldcrest Dr., Bonita Springs, FL (US) 34134; Stuart M. Jenkins, 105 Aldwick Road, Bognor Regis, West Sussex (GB) PO21 2NY ( * ) Notice: Subject to any disclaimer, the term of this patent is extended or adjusted under 35 U.S.C. 154(b) by 264 days.

(21) Appl. No.: 11/441,259

(22) Filed: May 25, 2006

Related U.S. Application Data

(60) Provisional application No. 60/685,090, filed on May 25, 2005.

(51) Int. Cl.
　　G08B 5/00　　(2006.01)
　　G01K 11/30　　(2006.01)
　　G06F 15/00　　(2006.01)
　　F21V 7/04　　(2006.01)
(52) U.S. Cl. ............... 340/815.4; 702/135; 362/612
(58) Field of Classification Search ............... 370/173, 370/175, 815.45, 815.4, 693.5, 693.7, 693.9; 250/330–334, 338.1–353, 495.1; 702/134, 702/135; 362/632, 559, 363, 555, 612
See application file for complete search history.

(56) References Cited

U.S. PATENT DOCUMENTS 4,987,990 A * 1/1991 Perkitny ............... 194/242
5,299,227 A    3/1994 Rose
5,986,581 A * 11/1999 Magdaleno et al. ......... 340/953
2004/0113817 A1  6/2004 Novak et al.

* cited by examiner

*Primary Examiner*—George A Bugg
*Assistant Examiner*—Jennifer Mehmood
(74) *Attorney, Agent, or Firm*—John P. McGonagle

(57) ABSTRACT

A programmable infrared beacon having an electronics circuit with a microprocessor contained within a transparent housing. A number of signaling infrared light emitting diodes are provided within the housing and connected to the electronics circuit. The beacon has a number of pins for inputting programs and controls and a number of color-coded light emitting diodes within the housing indicating the inputted program. An infrared received sub-circuit is provided to receive instructions from an external source. A programmer unit is also provided to prepare and transmit programs and controls to the beacon. Synchronization and cascading among beacons is provided with synchronization and delay programs within the microprocessor. An infrared detector is also provided to allow synchronization reception among beacons. In an alternate embodiment, a radio frequency transceiver and antenna is added to each beacon.

4 Claims, 7 Drawing Sheets

ANTIFRATRICIDE BEACON

CROSS-REFERENCE TO RELATED APPLICATIONS

Applicants claim the priority benefits of U.S. Provisional Patent Application No. 60/685,090, filed May 25, 2005.

BACKGROUND OF THE INVENTION

This invention relates to beacons, and more particularly to a beacon for use as a marker in conjunction with night vision applications and situations.

The inability of reconnaissance to determine friend or foe in low light or total darkness is a major failing in battlefield and law enforcement operations. The worst effect is that fratricide (the inadvertent killing of friendly forces by other friendly forces) occurs, and at best is a waste of time and resources attempting to confirm identification. Accurate intelligence allows deployment efforts to be maximized and focused.

Night vision equipment are light-intensifying systems and operate by amplifying visible and near infrared light. To assist in identification and recognition in low light conditions markers and beacons are used with this type of equipment. In this application a beacon emits a unique flashing Infrared (IR) signature that facilitates effortless nighttime identification and classification of a distant target or location by a remote observer using night vision equipment. Emissions generated by the beacon are invisible to the naked eye. The IR beacon signature is distinguished from operational surroundings by means of an intense concentrated energy pulse, coupled with a unique flashing sequence, referred to as the signaling code of the beacon. When viewed through a night vision device, the beacon signature cuts through fog, smoke and darkness.

SUMMARY OF THE INVENTION

The present invention provides improvements to antifratricide beacons of the prior art by the addition of a number of technical features embodied in a variety of designs that individually and together:

1. Extend the effective signaling range;
2. Improve battery utilization efficiency;
3. Maintain more constant brightness by continuous adjustment of the power applied to the IR signaling LEDs, thereby compensating for battery voltage deterioration as the battery is used up;
4. Increase the number of stored signaling codes;
5. Add factory installed fixed signaling codes which are permanent to the beacon;
6. Retain the signaling codes in non-volatile memory, thereby reducing the need for signaling code re-entry;
7. Provide good ergonomics associated with signaling code selection and entry;
8. Enable signaling code storage and management in a centralized location for code management and distribution;
9. Assure exact transfer of signaling codes from centralized storage into individual beacons;
10. Provide verification that the signaling codes which have been transferred from the centralized location to individual signaling beacons are identical to the source;
11. Synchronization of a number of beacons so that all beacons emit the identical signaling codes at exactly the same time, thereby providing a brighter composite signal and/or the capability for the identification of a group of items, individuals, or demarcation of geographical features such as targets, drop-zones, landing pads, runways, and the like;
12. Enable transfer and synchronization, and re-synchronization of signaling codes from beacon to beacon in the field without reliance on any support equipment; and
13. Provide for beacon activation by a trip-wire or other monitoring method for the detection of a disturbance or intrusion.

Prior art beacons provide emission of a covert signal visible at long ranges when viewed with night vision systems. The beacon flashes a constant frequency signal when a battery is attached.

The first invention beacon embodiment is a programmable infrared (IR) beacon designed for individual combat identification. It is excellent for covert marking and positive identification of individuals, airdrop bundles, vehicles, routes and landing zones. Any metallic object, such as a coin, can be used to enter and change the flashing code. The beacon may be coded, removed from the battery, and then, when reconnected, will emit the previously installed code. This allows the beacon to be used with an auxiliary power supply unit. An additional feature comprises the ability of the beacon to store multiple coded messages rather than one volatile code, which is lost whenever the battery is disconnected.

Typically the number of coded messages that are stored in the beacon is in the range from three to eight, and any of these coded messages can be pre-installed in the beacon at the time of building and made permanent if so desired. For example, a beacon may be designed to hold four variable messages and two fixed messages, e.g., "SOS" in Morse Code, a single letter in Morse Code, a fixed flash rate code, etc. The number of coded messages that are stored in the beacon is limited only by the amount of installed memory and the increasing complexity of locating the desired message and managing the message file.

Thus, the beacon can be preprogrammed before a mission in a reduced stress situation and while access to other personnel is available. The codes can be installed and used to represent different situations. In this way the beacon can be used to identify a specific point or person. If the user wishes to communicate a change of situation while maintaining radio silence, one of the alternate codes can be initiated. The battery or other power source may then be removed. The unit is activated when the battery or auxiliary power unit is once again reconnected and the beacon will automatically revert to the most recently used signaling code.

The beacon has a third pin installed and three independent program indicator low light LEDs. The program is installed by shorting two of the pins using a center and outer left pin. An indicator shows the code installed. A second indicator shows when the register is full. The installed code can be checked. To install additional messages the center and right pin are shorted. An indicator shows that the unit is in the next register and then the code is installed. The code is tested by shorting across the left and center pin.

Operation of the beacon is performed by making contact between the metallic pins protruding at the top of the beacon with any convenient metal object while observing the response of the beacon on the visible indicator LEDs contained within the transparent envelope of the beacon. The number of metallic pins protruding at the top of the beacon may be two or more depending on the human factors choice of the user. While all operations of the beacon can be performed with the use of just two pins, the introduction of additional pins can be used to simplify operation as additional pins can then be dedicated to a single function. Similarly, the number of visible indicator LEDs for feedback to the user can be reduced by the use of various flashing patterns or flashing of the indicator LEDs in combination. In a typical design, a beacon with four variable operator installed signaling programs and two permanent signaling programs may be constructed with the use of four indicator LEDs of different colors with one each of the indicator LEDs lighting indicating a variable program and two indicators lighting together in combination to indicate the two permanent signaling programs.

In the two-pin design embodiment, all operations of the beacon are determined by making contact between the two pins. The resultant effect is determined by the duration and sequencing of each contact. The visible LEDs serve to provide feedback to the user of the pin connecting as it is made and the current state of operation. In normal operation, the beacon will be emitting the infrared signaling pattern and the indicator LEDs will be all turned off for improved covert operation. A very brief contact between the beacon pins will result in the lighting of the indicator LEDs that are associated with the current signaling program that is being emitted by the IR signaling LEDs. The lighted indicator LEDs will flash the signaling pattern for the next thirty seconds to show the user the signaling program that is being emitted by the beacon. A longer contact between the beacon pins will result in a change of signaling program from the current to the next one. Repeated longer contacts between the beacon pins allow for an endless-loop scan through all the programs stored on the beacon. A prolonged contact between the beacon pins of more than three seconds will result in erasure of the currently running variable program. The completion of erasure is communicated to the user by alternate flashing of the current program indicator LED and the indicator LEDs associated with the other programs. Once the current program has been erased, a new program may be entered into the beacon by alternately making contact and releasing contact between the pins in the sequence of the desired signaling pattern. Once the new signaling program has been entered, the beacon reverts to normal operation, the IR LEDs emitting the newly entered signaling program and for the next thirty seconds lighting the program indicator LEDs in the same lighting pattern to confirm to user that the new signaling program has been installed successfully and is being transmitted by the beacon.

A three-pin design of the beacon may utilize contact between pin 1 and 2 for identification of the currently running program and advance through the stored programs for program selection. Contact between pins 2 and 3 may then be dedicated to signaling program erasure and new signaling program entry. Similarly, a four-pin design of the beacon can be utilized to further separate the functions between the pins with less reliance on timing of the contracts that are made between the pins A second beacon embodiment introduces the ability to receive signaling programs over an infrared serial communication link from a separate programming controller which contains a large memory for storing a multiplicity of signaling patterns and is provided with a convenient human interface for managing the stored signaling patterns and selection of signaling patterns for down loading into individual beacons. Every beacon of the second embodiment type monitors the arriving signal on the infrared signaling link listening for a special numerical code which identifies that the signal being received is from a beacon programming controller. Whenever the special numerical code is received, the beacon knows that the following data will first be a command which will identify in which programming location the following signaling pattern data should be stored.

The form of the signaling pattern is in compressed data form, which can be sent at much higher speed that the signaling pattern which the data represents. Also, as the signaling pattern is transmitted as data rather than contact timings, transmission of the signaling pattern using this means incurs no loss of fidelity. Furthermore, the incorporation of check sum and/or error correction information as part of the data transmission allows for verification that the data transmission has occurred correctly or may be repaired using the error correction information.

A third beacon embodiment is also provided, i.e., a synchro beacon. This embodiment provides the ability to synchronize the signal flashing of beacons so that, once synchronized, all beacons flash the same signaling program in exact unison. Any synchro beacon can be the original programming source for the signaling pattern and any other synchro beacon can copy that pattern and then flash in exact synchronism with the source beacon. The underlying feature that makes the synchro beacons possible is the inclusion of a very precise clock in every beacon that is accurate to less than 0.1 seconds over 24 hours. These clocks are synchronized when a signaling pattern is copied from one beacon to another.

A synchro beacon design is produced by the addition of serial infrared communications transmission hardware and the addition of a very precise clock to the second embodiment of the beacon described previously. During normal operation, the clock within the synchro beacon triggers the signaling message start time and precisely paces the rate of the signaling message emission. Once every message emission cycle, every synchro beacon always transmits the data that describes the signaling message that is being emitted and a time strobe when the signaling message begins using the infrared serial communications link. The light from this infrared link is emitted orthogonally to the beacon signaling LEDs and, having relatively low power, does not noticeably interfere with the IR signal emitted by the beacon. Another synchro beacon, when placed in the path of the serial infrared signal of a running synchro beacon, is able to receive the coded message when given the command to do so. This command is given by electrically shorting the "copy" pin with the common pin on the receiving synchro beacon. That shorting action activates the infrared receiver on the synchro beacon which will then monitor the data arriving on its serial infrared receiver. The data arriving from another synchro beacon will first of all be modulated at a frequency such as 38 KHz to help differentiate the serial infrared data of another synchro beacon from other infrared light activity which might interfere with signal reception integrity. Next, all synchro beacons first transmit a synchro beacon identification number code that is utilized to confirm that the data being received is from another synchro beacon. Once the identification number is validated, the synchro beacon then receives data that describes a signaling pattern which is transmitted in compressed form and stores that data in its non-volatile program in the same manner as any other signaling program. Finally, the transmitting synchro beacon sends a check sum of the transmitted data which allows the receiving synchro beacon to validate the integrity of the received signaling program. The last bit of the transmitted check sum provides the time mark for synchronizing the internal clock in the synchro beacon. Upon receipt of the final bit, the synchro beacon resets the internal clock to the beginning of the signaling cycle, disables reception on the infrared serial link receiver, and starts normal emission operation of the newly received signaling code. The timing of the emission of the signaling code is controlled by the very accurate clock, which having been synchronized with the beacon that was the source of the signaling program, now runs the emitted code in exact synchronism with the source beacon. As all synchro beacons can be both the source and/or receiver of a signaling pattern, the signaling patterns can be copied sequentially from one beacon to the next with the only limitation being the very small hardware timing errors introduced in the synchronization of the clocks.

Any time that any group of synchro beacons begins to drift out of synchronization, it is possible to re-copy the signaling programs and timing to bring them back into synchronism. As the signaling pattern data is transmitted in digital form and validated upon reception with the use of the check-sum, recopying of signaling programs from synchro beacon to synchro beacon does not incur cumulative errors.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
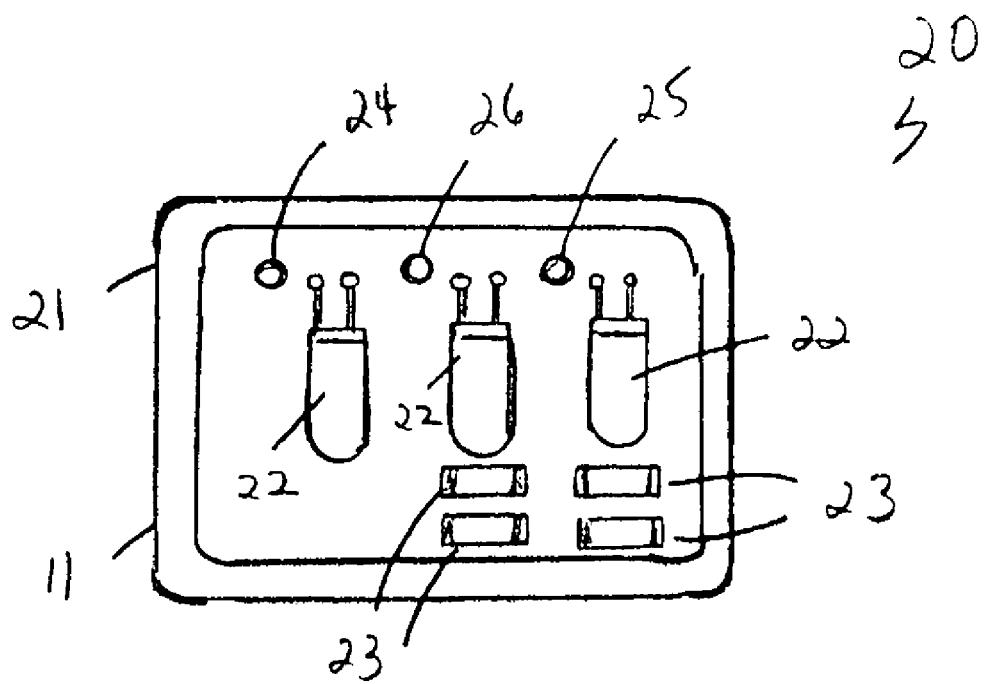
FIG. 1 is a physical top view of a first embodiment of the invention
Figure 2:
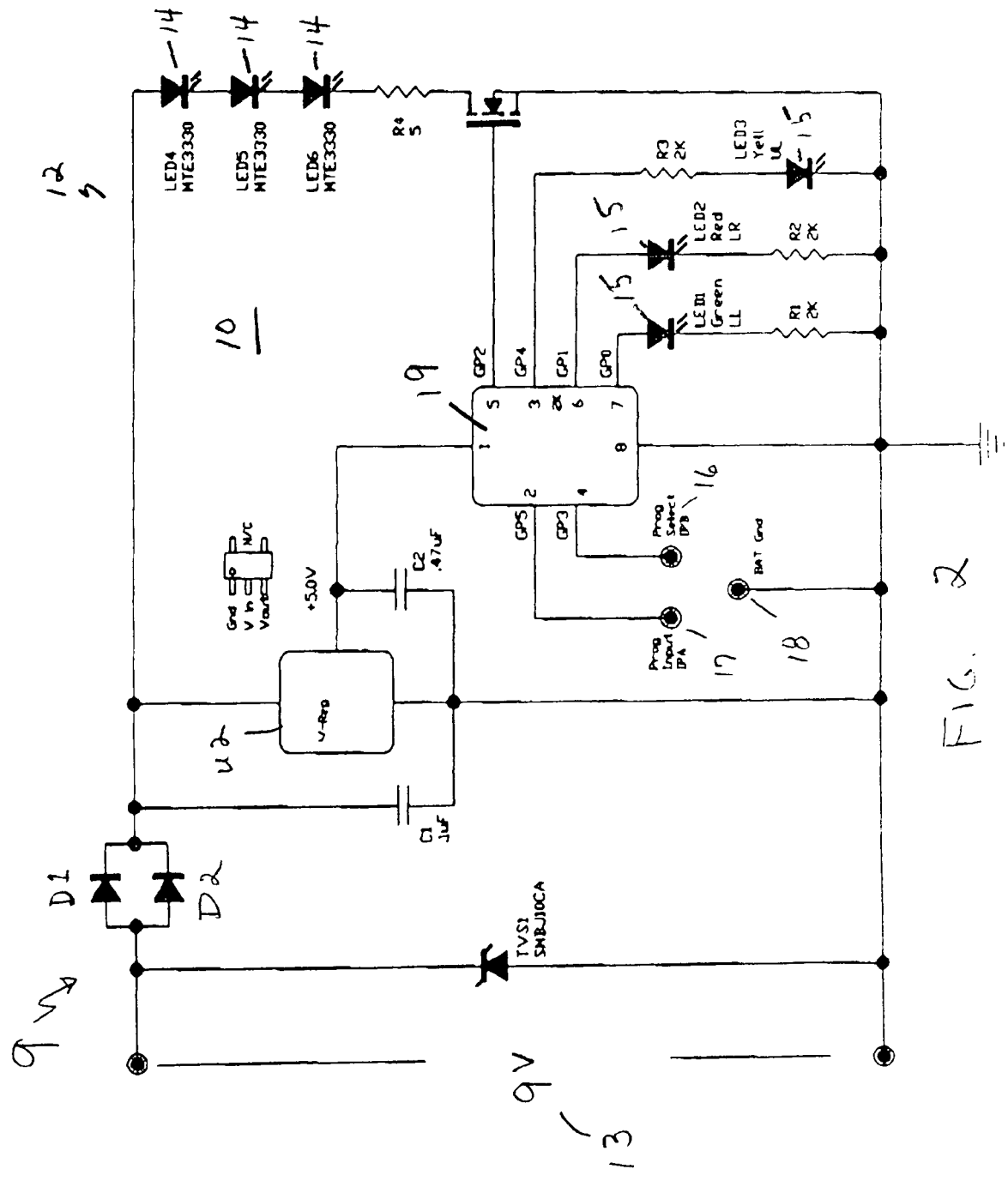
FIG. 2 is a schematic circuit diagram thereof with three program-indicator LEDs.
Figure 3:
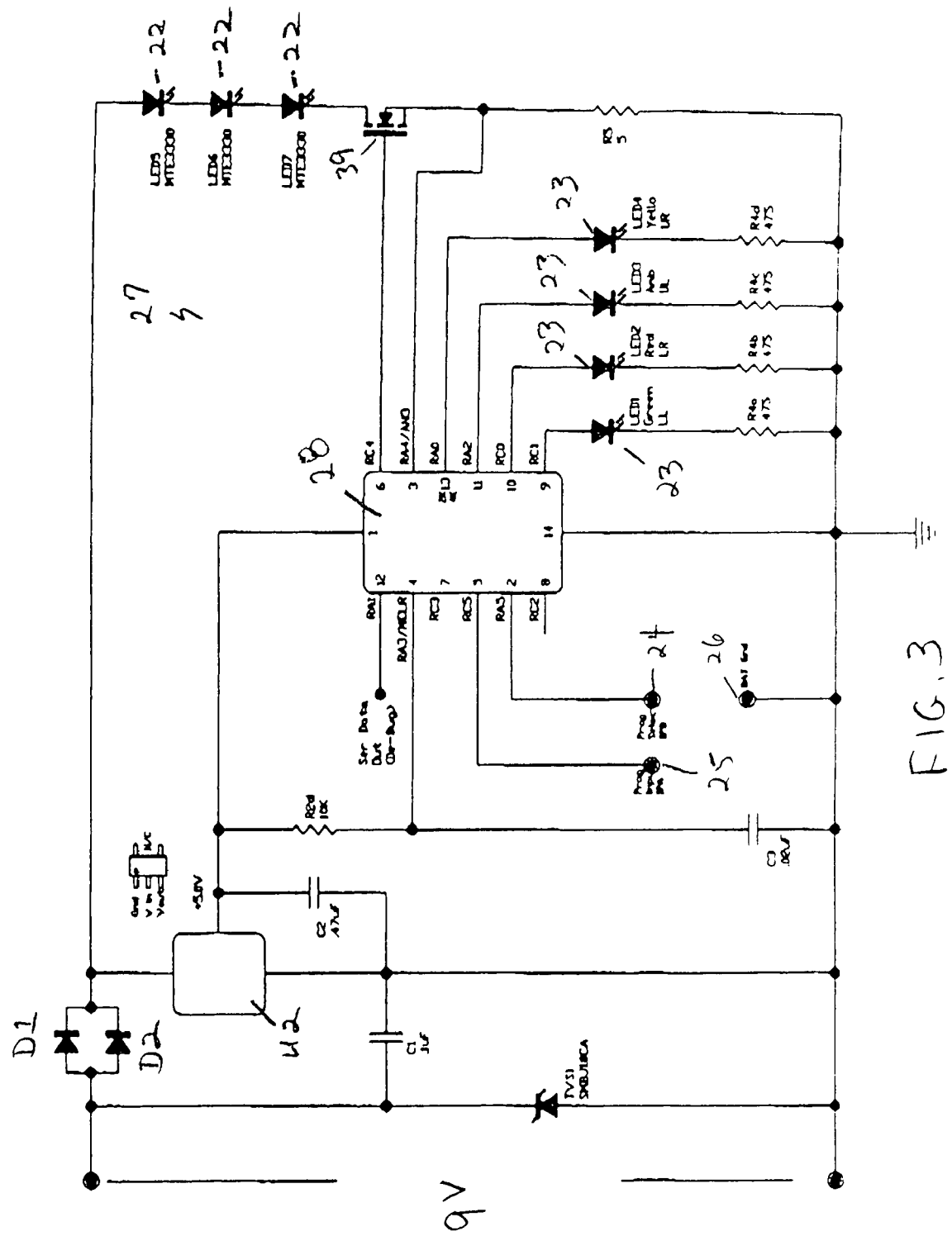
FIG. 3 is a schematic circuit diagram thereof with four program-indicator LEDs.

Referring to the drawings in detail wherein like elements are indicated by like numerals, there is shown in FIGS. 1-3, the first embodiment of the invention, FIG. 1 being a physical top view, FIG. 2 being a schematic circuit diagram with three program indicator LEDs 15, and FIG. 3 being a schematic circuit diagram with four indicator LEDs 23. The first invention beacon embodiment is a programmable infrared (IR) beacon designed for individual combat identification. The beacon may be coded, removed from the battery, and then when reconnected will emit the previously installed code. This allows the beacon to be used with an auxiliary power supply unit. An additional feature comprises the ability of the beacon to store multiple coded messages rather than one volatile code which is lost whenever the battery is disconnected.

The first beacon embodiment circuit 10 has a transparent housing 11 containing microprocessor-based electronics circuitry 12 operating the beacon 10. The circuitry 12 is powered by with a 9 volt battery input 13. Reversed battery protection subcircuitry 9 is also provided. Three signaling IR LEDs 14 are contained within the housing 11 and are electrically connected to the microprocessor 19. Three program indicator LEDs 15 are also contained within the beacon housing 11 and are electrically connected to the microprocessor 19. The program indicator LEDs 15 are color coded, e.g., green, red, and yellow. The housing 11 has a program select "B" pin 16, program input "A" pin 17, and a common ground pin 18. The three pins 16, 17, 18 are electrically connected to the circuitry 12.

Referring more particularly to FIGS. 2 and 3, another beacon circuit embodiment 20 constructed according to the principles of the first embodiment is shown. The beacon 20 has a transparent housing 21 containing microprocessor-based electronics circuitry 27 operating the beacon 20. Three signaling IR LEDs 22 are mounted in the housing 21 and are electrically connected to the microprocessor 28. Four program indicator LEDs 23 are also mounted in the beacon housing 21 and are electrically connected to the microprocessor 28. The program indicator LEDs 23 are color coded, e.g., green, red, amber, and yellow. The housing 21 has a program select "B" pin 24, program input "A" pin 25, and a common pin 26. The three pins 24, 25, 26 are electrically connected to the circuitry 27.

Figure 4:
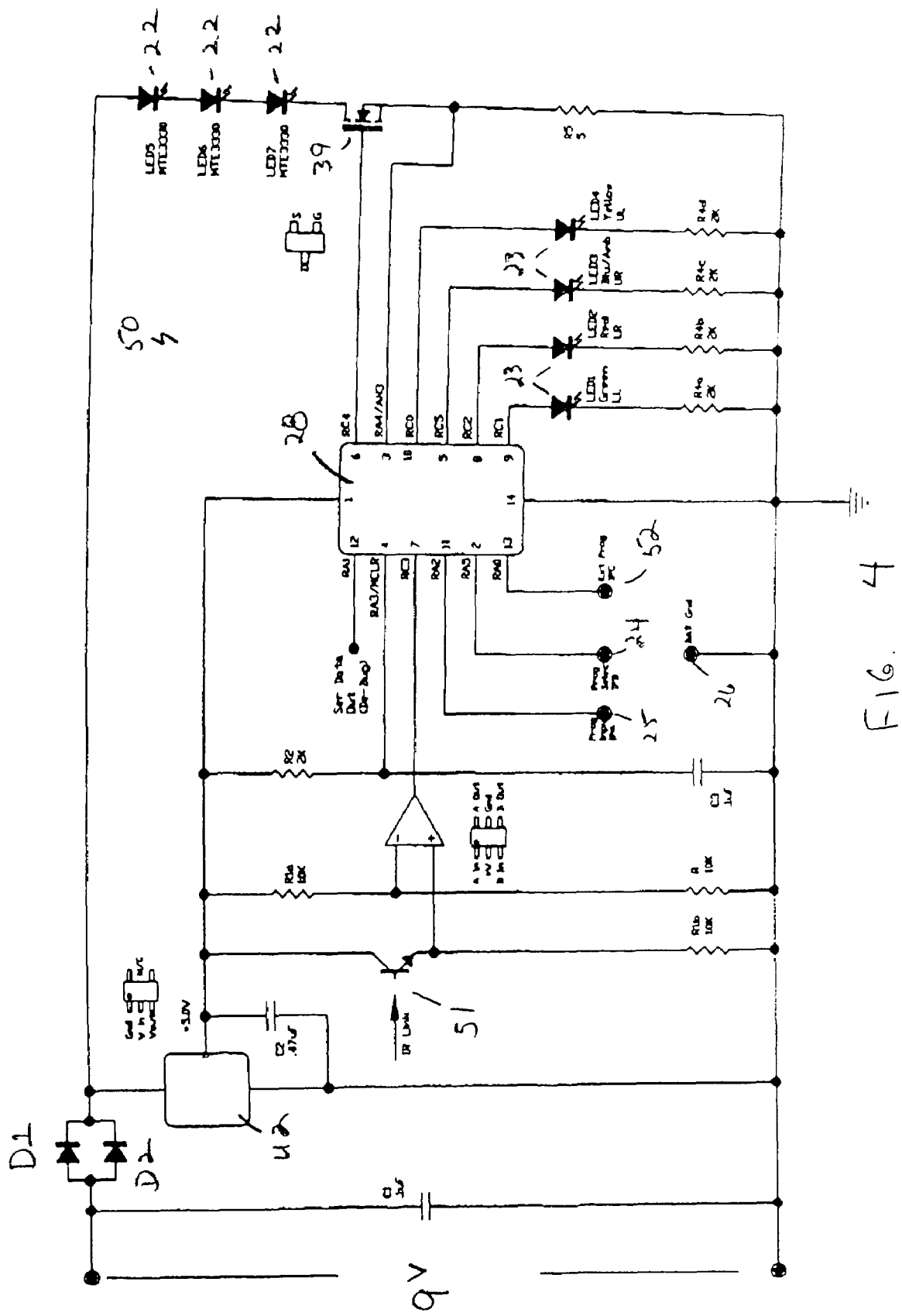
FIG. 4 is a schematic circuit diagram of a second antifratricide beacon embodiment comprising a two-channel signaling beacon.

Referring more particularly to FIG. 4, there is shown a schematic circuit diagram of the second beacon embodiment 50. Most of the circuit layout is identical to the embodiment described above with the following exceptions. An IR link 51 is provided for inputting commands and programs. An external programming pin 52 is also provided.

The present invention also provides a programmer 60 for the beacons, especially the second beacon embodiment. See FIG. 5. A user can pre-install up to 20 programs in the programmer memory. The programs can be reviewed for accuracy prior to transferring the message code to a beacon. Selected codes can be changed by the user at any time. Once recorded the programs can be selectively transferred from memory with a single keystroke to as many beacons as required assuring that the transferred program codes are identical. The code installer has the option of selecting and installing up to 8 pre-programmed codes into the fourth embodiment beacon of the 20 codes in the programmer or manually installing codes in as many as 8 programming slots as desired to make each beacon completely unique. Each signaling program is stand alone so a series of units can have groups of codes all the same and other that are different allowing the observer to distinguish between individual beacons.

Figure 5:
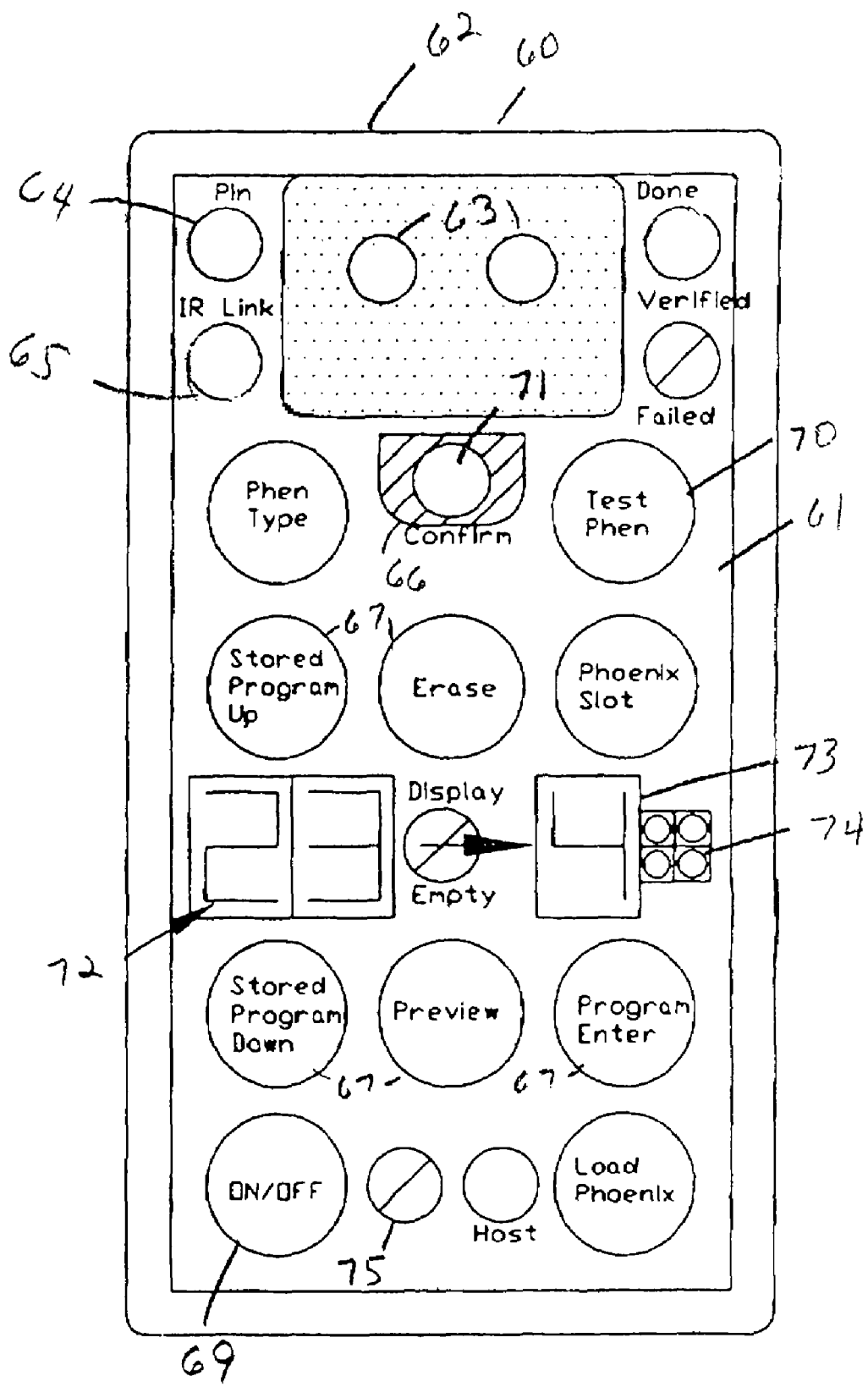
FIG. 5 illustrates the programmer control panel for a two-channel, signaling beacon.

Referring more particularly to FIG. 5, there is shown a beacon programmer control panel 61. The programmer top 62 has battery snaps 63 which will accept any of the invention beacons. A programming pin "C" 64 for programming beacons is provided. An IR serial emitter link 65 is also provided for programming the fourth embodiment beacon. A photo sensor 66 is provided, said photo sensor detecting the beacon IR emission signaling pattern and converting that to a red color display that is visible to the naked eye. Momentary action push-button switches 67 for controlling the programmer functions are provided. A plurality of LED indicators are also provided. The programmer has an ON/OFF push button 69 for turning the programmer ON and OFF. The programmer turns off automatically after 5 minutes if no buttons are actuated. A test button 70 is provided. Pressing this button applies power to the beacon which, if working correctly, will go into normal operational mode and emit the IR signaling pattern. The signaling pattern will be detected by the photo sensor 66 and the emitted signaling pattern will be duplicated by a confirm LED at a wavelength visible to the naked eye. A controller stored program number indicator 72 and beacon slot destination numeric indicator 73 and LED indicator 74 are also provided. A battery low indicator LED 75 is also provided.

A USB connection is provided with each programmer 60 for connection to a personal computer/laptop/Ipod for signaling program management. With a personal computer used as a warehouse for codes, the number of codes that can be stored and management is substantial. The codes can be selectively downloaded into each programmer which can then be further selectively downloaded to each beacon assigned to an individual. With this capability, a field commander will be able to identify units and individuals by observing the signal codes and using a lookup table in the computer.

Figure 6:
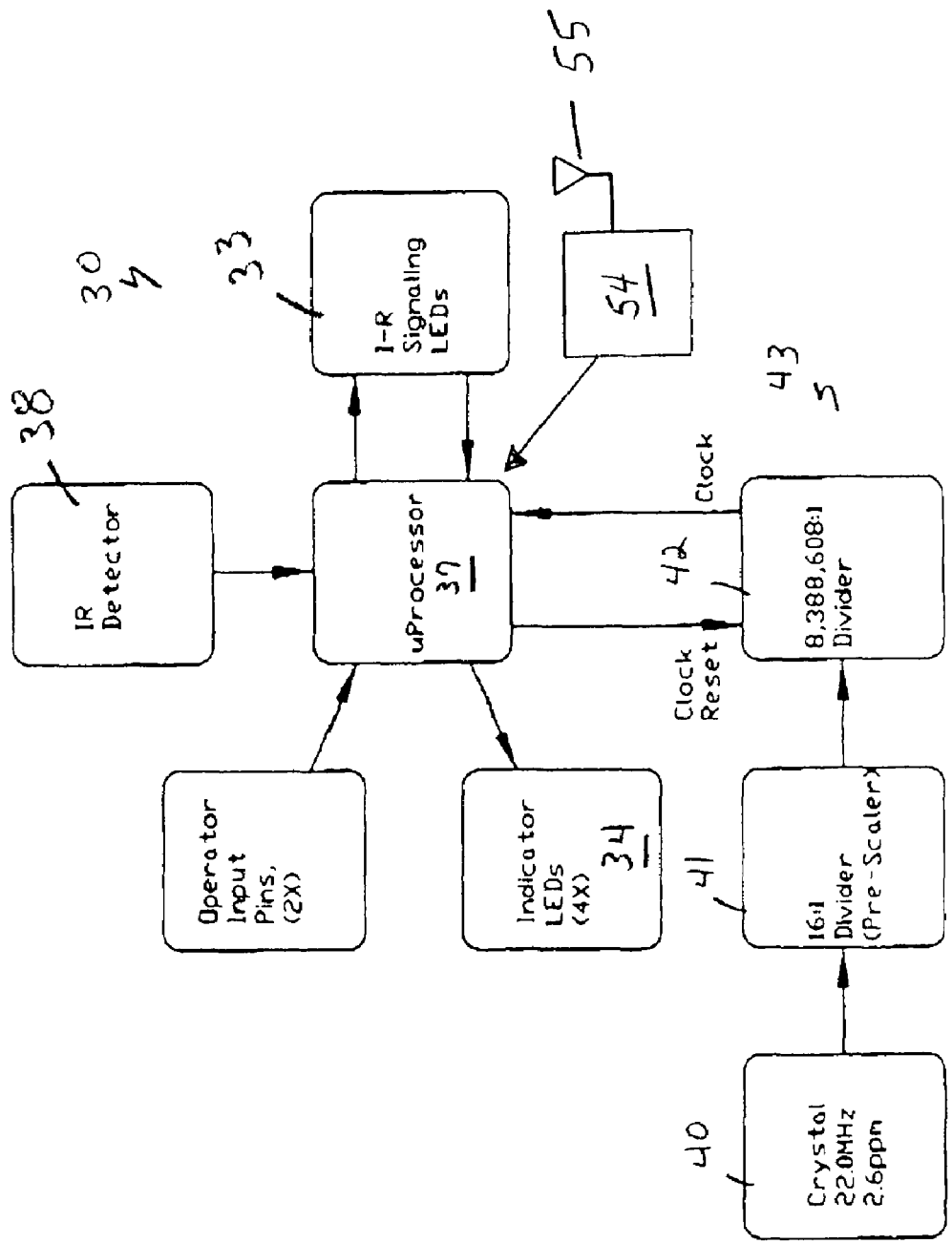
FIG. 6 is an architectural block diagram of a third antifratricide beacon embodiment comprising the synchro beacon.
Figure 7:
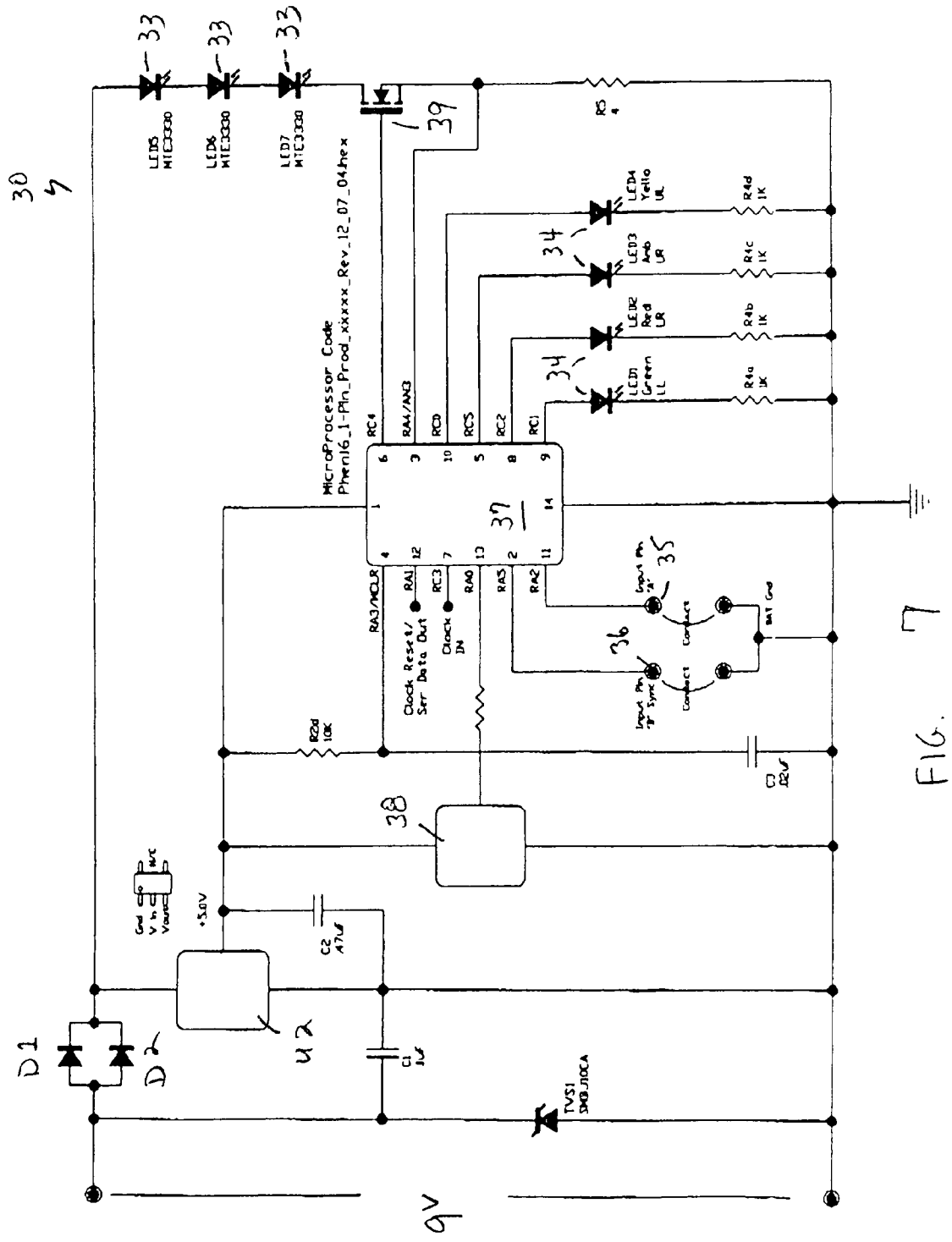
FIG. 7 is a schematic circuit diagram thereof.

Referring more particularly to FIGS. 6-7 there is shown the third beacon embodiment which is a synchro beacon 30. Referring more particularly to FIG. 6, there is shown a block diagram of the main elements of the synchro beacon architecture. The synchro beacon elements are tied together and driven by a microprocessor 37. The microprocessor 37 records and stores in memory three 6-second long signaling programs which are then emitted on a plurality of IR signaling LEDs 33. The emitted signal is frequency modulated to improve sensing by another synchro beacon and pulse-width modulated to control the power input to the signaling LEDs 33. Once every signaling cycle the microprocessor measures the current being drawn by the LEDs 33 and re-calculates the maximum permissible power input to the LEDs taking into account the power density of the signal program that is running.

Three signaling IR LEDs 33 are connected to and controlled by the microprocessor 37. Four program indicator LEDs 34, color coded, e.g., green, red, amber, and yellow, are driven directly by the microprocessor 37. The synchro beacon 30 has two input pins and a ground pin sensed directly by the microprocessor 37. One input pin is the program input "A" pin 35. The "A" pin 35 is used for signaling program selection and recording new signaling programs the same way as the prior embodiments. The main functional difference with the prior embodiments is the addition of the second input pin, i.e., the "B" synchro pin 36, which is used exclusively for initiating signal program copying among synchro beacons. The synchro beacon 30 has an IR detector 38 which is tuned to receive the IR signal from another synchro beacon. The IR detector 38 is sensed directly by the microprocessor 37.

A 22.00 MHz crystal 40 followed by a 16:1 frequency divider 41 which in turn is followed by a 8,388,608:1 divider 42 form a clock 43 that produces a 6-second timing pulse to an accuracy of less than 0.1 seconds over a 24-hour period. This clock 43 is used for the timing of the IR signal program emitted by a synchro beacon and is locked to a "Master" synchro beacon when a signaling program is copied from one beacon to another. The "locking" is controlled by the microprocessor by resetting the clock based on the signaling program that is received.

Referring more particularly to FIG. 7, there is shown a schematic circuit diagram of a synchro beacon 30. A linear voltage regulator U2 provides voltage to the microprocessor 37 and also provides power to the clock 43. The microprocessor 37 drives the program indicator LEDs 34 directly with array resistors R4a through R4d providing current limiting. The microprocessor 37 drives an N-MOS gate 39 which controls the application of the battery voltage to the three IR signaling LED diodes 33. The R5 resistor in series with the source terminal of the N-MOS gate 39 provides feedback to the microprocessor of the current through the three signaling LEDs 33 which are connected to the drain side of the N-MOS gate 39.

The IR detector 38 is tuned for reception to a frequency matching the frequency emitted by all synchro beacons. Clock synchronization is performed by the microprocessor based on pattern recognition of the IR signaling program of another synchro beacon received by the IR detector 38. When the microprocessor 37 recognizes an appropriate synchronization pattern received from the other beacon, the microprocessor issues a clock reset command to the clock divider 42 and begins recording the receive pattern.

This embodiment of the invention may be enhanced by adding a two-channel signaling capability. The beacon's storage capability is 8 messages in non-volatile memory so that once installed the messages are retained regardless of the power being connected. The beacon has indicators showing which program is active. Channel 1 (the default code) is programmed in-shop with a special encoder 60. Channel 2 has a user-programmable temporary memory which can be installed in the field using any metallic object such as a coin. The beacon has indicators which show which program is active.

A cascade effect may be made with a number of beacons by inserting a delay into successive synchro beacons. This may be done in the microprocessor memory. To cascade a number of beacons, the beacons must be synchronized, numbered, programmed and installed in sequence.

In another embodiment of the invention, a radio frequency transceiver 54 with a radio frequency antenna 55 may be added to each beacon. See FIG. 6. This provides a means of beacon control which does not require line-of-sight between controller and beacon.

It is understood that the above-described embodiment is merely illustrative of the application. Other embodiments may be readily devised by those skilled in the art which will embody the principles of the invention and fall within the spirit and scope thereof.

We claim:

1. A programmable infrared beacon for individual combat identification, comprising:
    a transparent housing:
    an electronics circuit within said housing, said electronics circuit having a microprocessor with memory;
    a power source adapted to provide electrical power to said electronics circuit;
    a plurality of signaling infrared light emitting diodes within the housing and electrically connected to the microprocessor;
    a plurality of program indicator light emitting diodes within the housing and electrically connected to the microprocessor, said program indicator light emitting diodes being color coded;
    said housing having three pins electrically connected to said electronics circuit, one said pin being a program select pin, one said pin being a program input pin and the remaining pin being a common ground pin;
    an infrared receiver sub-circuit connected to said electronics circuit, said infrared receiver sub-circuit adapted to receive coded infrared commands from a source external to the housing;
    an external programming pin electrically connected to said electronics circuit;
    a programmer unit having a plurality of signaling programs and an infrared transmitter, said transmitter adapted for communicating with said infrared receiver sub-circuit, wherein said programmer unit is further comprised of:
        a housing having a beacon programmer control panel;
        a plurality of connectors on said control panel adapted to connect to said infrared beacon and provide power to said infrared beacon;
        a programming pin on said control panel for providing said signaling programs to said beacon;
        an infrared serial emitter link on said housing for communicating with said infrared beacon sub-circuit;

a photo sensor on said control panel for detecting an infrared beacon infrared emission signaling pattern and converting said pattern to a color display visible to a naked eye;

a plurality of momentary action push-button switches on said control panel for controlling a plurality of programmer unit functions;

a plurality of light emitting diode indicators on said control panel;

a universal serial bus connection for connection to an external electronic device selected from the group consisting of personal computers, laptop computers and hand-held computers.

2. A programmable infrared beacon as recited in claim 1, further comprising:

a plurality of synchronization signaling programs within said microprocessor memory, said signaling programs adapted to being emitted on said plurality of signaling infrared light emitting diodes;

a synchro input pin for initiating a synchronization signaling program;

an infrared detector tuned to receive an emitted synchronization signaling program, said infrared detector electrically connected to said microprocessor;

a high precision clock connected to said microprocessor for timing said emitted synchronization signaling program and resetting a microprocessor clock based on a detected synchronization signaling program.

3. A programmable infrared beacon as recited in claim 2, further comprising:

a program in said microprocessor memory inserting a delay in said reset microprocessor clock.

4. A programmable infrared beacon as recited in claim 3, further comprising:

a radio frequency transceiver connected to said electronics circuit; and a radio frequency antenna connected to said transceiver.

* * * * *